US010326949B2

(12) United States Patent
Nguyen

(10) Patent No.: US 10,326,949 B2
(45) Date of Patent: Jun. 18, 2019

(54) INTEGRATED SWITCH AND SHUTTER FOR CALIBRATION AND POWER CONTROL OF INFRARED IMAGING DEVICES

(71) Applicant: FLIR Systems, Inc., Wilsonville, OR (US)

(72) Inventor: Vu L. Nguyen, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 210 days.

(21) Appl. No.: 15/174,713

(22) Filed: Jun. 6, 2016

(65) Prior Publication Data

US 2016/0366349 A1    Dec. 15, 2016

Related U.S. Application Data

(60) Provisional application No. 62/173,233, filed on Jun. 9, 2015.

(51) Int. Cl.
 *H04N 5/33*   (2006.01)
 *H04N 17/00*  (2006.01)
 *H04N 5/232*  (2006.01)

(52) U.S. Cl.
 CPC .............. *H04N 5/33* (2013.01); *H04N 5/232* (2013.01); *H04N 17/002* (2013.01); *H04N 5/23241* (2013.01)

(58) Field of Classification Search
 CPC .. H04N 17/002; H04N 5/232; H04N 5/23241; H04N 5/33
 See application file for complete search history.

(56) References Cited

U.S. PATENT DOCUMENTS

| 5,436,457 A * | 7/1995 | Tomita ...................... G01J 3/10 |
| | | 250/338.1 |
| 6,995,359 B1 * | 2/2006 | Hillenbrand .............. G01J 3/02 |
| | | 250/252.1 |
| 8,373,757 B1 * | 2/2013 | Nguyen ................ H04N 17/002 |
| | | 250/252.1 |
| 2006/0056838 A1 * | 3/2006 | Chen ...................... G03B 17/02 |
| | | 396/448 |
| 2007/0019103 A1 * | 1/2007 | Lieberman .......... G02B 26/0808 |
| | | 348/344 |
| 2008/0112029 A1 * | 5/2008 | Bodkin ...................... G01J 3/02 |
| | | 359/233 |
| 2008/0218611 A1 * | 9/2008 | Parulski ................ H04N 5/2258 |
| | | 348/262 |

(Continued)

*Primary Examiner* — Marcus H Taningco
(74) *Attorney, Agent, or Firm* — Haynes and Boone, LLP

(57) ABSTRACT

Various devices including a three-stage switch and an infrared (IR) imaging module and methods for performing FFC using the three-stage switch and the IR imaging module are provided. The three-stage switch may have at least a first position in which the IR imaging module is powered off, a second position in which the IR imaging module is powered on and the shutter is positioned in the FOV, and a third position in which the IR imaging module is powered on and the shutter is positioned out of the FOV, wherein the second position is intermediate in relation to the first position and the third position. A thermal image of the shutter may be captured while the switch is at or adjacent to the second position, and an FFC map of FFC terms may be acquired based on the thermal image of the shutter.

20 Claims, 7 Drawing Sheets

(56) References Cited

U.S. PATENT DOCUMENTS

| | | | |
|---|---|---|---|
| 2013/0147966 A1* | 6/2013 | Kostrzewa | H04N 5/33 348/164 |
| 2013/0258111 A1* | 10/2013 | Frank | H04N 5/33 348/164 |
| 2015/0009335 A1* | 1/2015 | Strandemar | H04N 5/33 348/164 |
| 2016/0316119 A1* | 10/2016 | Kent | H04N 5/2257 |
| 2016/0316154 A1* | 10/2016 | Elmfors | H04N 5/332 |

* cited by examiner

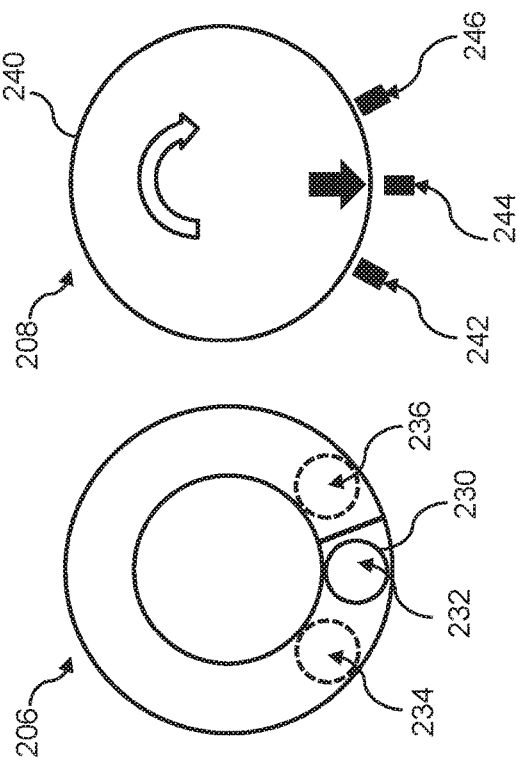

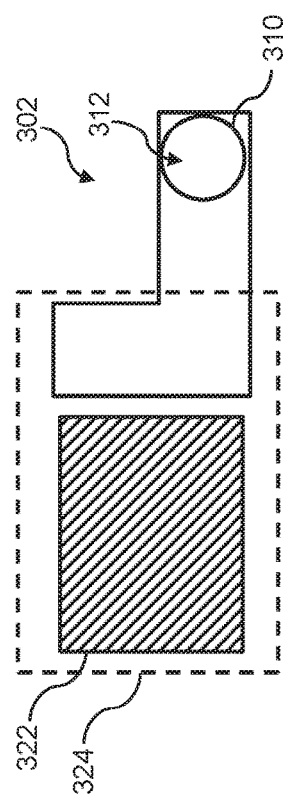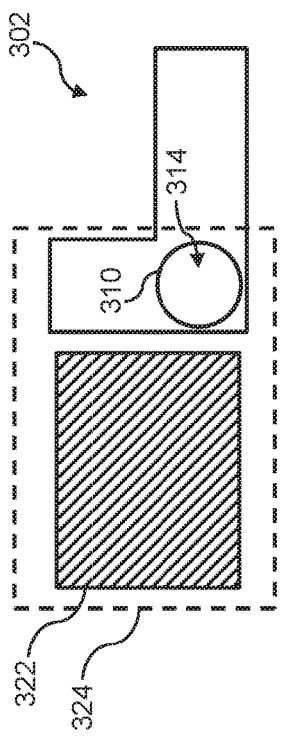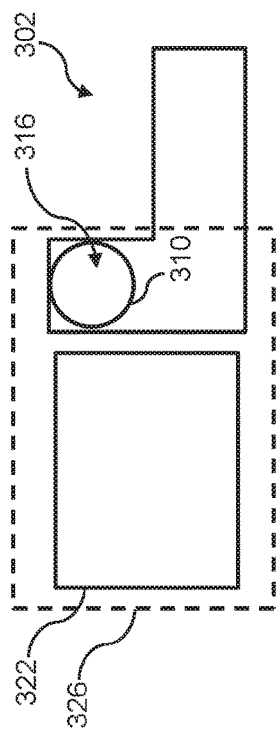

INTEGRATED SWITCH AND SHUTTER FOR CALIBRATION AND POWER CONTROL OF INFRARED IMAGING DEVICES

CROSS-REFERENCE TO RELATED APPLICATIONS

This application claims the benefit of and priority to U.S. Provisional Patent Application No. 62/173,233, filed Jun. 9, 2015, and entitled "INTEGRATED SWITCH AND SHUTTER FOR CALIBRATION AND POWER CONTROL OF INFRARED IMAGING DEVICES," which is incorporated herein by reference in its entirety.

TECHNICAL FIELD

One or more embodiments relate generally to imaging devices and, more particularly for example, an integrated switch and shutter for infrared imaging devices.

BACKGROUND

Focal plane arrays (FPAs) that detect infrared (IR) radiation, such as thermal IR radiation, are used by IR cameras to provide thermal images. For example, thermal radiation passing through an optical path of an IR camera is received by IR detectors of the FPA, which provide image data for pixels of thermal images.

The quality of thermal images provided by FPAs may be degraded due to non-uniform responses among the individual IR detectors to incident IR radiation. Because the magnitude of the non-uniformity may be large in comparison to the magnitude of the actual response due to the incident IR radiation, various techniques are typically used to compensate for the non-uniformity and obtain a desirable signal-to-noise ratio.

For example, in some conventional IR imaging devices, an FPA may be calibrated over one or more levels of photon flux by inserting a mechanical shutter that can selectively be moved into the optical path of the IR camera. The FPA takes one or more data frames or snapshots of the shutter to calibrate its response, and the collected data may then be used to calibrate the FPA to provide a more uniform response. Such a mechanical shutter may also be found in some non-thermal (e.g., visible light) imaging devices having charge-coupled devices (CCDs) or complementary metal-oxide (CMOS) sensors, for example, for calibration and/or imaging capturing purposes.

An automatic mechanical shutter requires a shutter blade (e.g., a shutter paddle), an actuator (e.g., a motor) and an associated drive train to move the shutter blade in and out of the optical path. As such, an automatic mechanical shutter, if integrated into or otherwise provided in an imaging device, may increase the size, complexity, and cost of the imaging device, which is undesirable especially for compact imaging devices. Furthermore, mechanical components such as motors and associated drive trains of automatic mechanical shutters are more prone to wear and tear than solid state components such as a FPA, and thus adversely affect the overall reliability and longevity of imaging devices that rely on automatic mechanical shutters.

SUMMARY

In one or more embodiments, a device includes an infrared (IR) imaging module configured to capture thermal images for a field of view (FOV); and a switch assembly including a switch coupled to a shutter, the switch having at least a first position in which the IR imaging module is powered off, a second position in which the IR imaging module is powered on and the shutter is positioned in the FOV to be imaged by the IR imaging module for acquisition of flat field correction (FFC) terms, and a third position in which the IR imaging module is powered on and the shutter is positioned out of the FOV, wherein the second position is intermediate in relation to the first position and the third position.

In some embodiments, the switch is configured to move between the first and third position along a contiguous path, and the second position is intermediate by being located on the path between the first and third position. The switch may be configured to move between the first and second position along a first direction and between the second and third position along a second direction. For example, the path may be linear and the first and second direction may be one in the same. In another example, the path may be an L-shape and the first and second direction may be substantially orthogonal. In a further example, the path may be an arch and the first and second direction may be around the arch. In some embodiments, the switch is configured to rotate around an axis, and the second position is intermediate by having a rotational position between the first and third position.

In some embodiments, the switch is configured to mechanically control power provided to the IR imaging module, and the shutter is mounted on the switch or mechanically coupled to the switch such that movement of the shutter depends on movement of the switch.

In some embodiments, the device further includes a non-volatile memory configured to store a plurality of FFC maps; and a processor configured to operate the IR imaging module to capture a thermal image of the shutter while the switch is at or adjacent to the second position, acquire an FFC map of the FFC terms based on the thermal image of the shutter, store the acquired FFC map as one of the plurality of FFC maps in the non-volatile memory, select one of the plurality of FFC maps, apply the selected FFC map to the IR imaging module, and operate the IR imaging module to capture a thermal image of a scene while the switch is at the third position.

In some embodiments, the processor is configured to store the acquired FFC map in response to checking that one or more conditions are met, the one or more conditions relating to a timestamp, an elapsed time since last acquired FFC map, an elapsed time since powering on, a temperature, image uniformity, and/or thermal stability; and select the one of the plurality of FFC maps according to one or more ranking criteria including a temperature, a rate of change in temperature, a timestamp, and/or image uniformity associated with the plurality of FFC maps.

In some embodiments, the processor is configured to operate the IR image module to capture the thermal image of the shutter in response to the switch being moved from the first position to the third position by way of the second position to power on the IR imaging module.

In some embodiments, the processor is configured to operate the IR image module to capture the thermal image of the shutter in response to the switch being moved from the third position to the first position by way of the second position to power off the IR imaging module.

In some embodiments, the device further includes a temperature sensor configured to measure temperatures of the shutter, and the IR imaging module is configured to measure temperatures of a focal plane array (FPA) in the IR imaging module, and the processor is configured to operate the temperature sensor to measure a temperature of the shutter while the switch is at the second position, operate the IR imaging module to measure a temperature of the FPA while the switch is at the second position, and acquire the FFC map further based on the temperature of the shutter and the temperature of the FPA.

In some embodiments, the device further includes a temperature sensor mounted on the shutter configured to measure temperatures of the shutter, and the processor is configured to operate the temperature sensor to measure a temperature of the shutter to determine radiometric calibration terms while the switch is at the second position, and apply the radiometric calibration terms to the IR imaging module.

In one or more embodiments, a method includes providing power to an IR imaging module in response to a switch coupled to a shutter being moved from a first position to a second position; capturing a thermal image of the shutter while the switch is at or adjacent to the second position, wherein the second position is intermediate in relation to the first and a third position; acquiring a FFC map of FFC terms based on the thermal image of the shutter; storing the acquired FFC map as one of a plurality of FFC maps; selecting one of the plurality of FFC maps; applying the selected FFC map to an IR imaging module; and capturing a thermal image of a scene while the switch is at the third position.

In some embodiments, the method further includes receiving a force from a user to move the switch between the first and third position along a contiguous path, and the second position is intermediate by being located on the path between the first and third position.

In some embodiments, the method further includes receiving a rotational force from a user to rotate the switch around an axis, and the second position is intermediate by having a rotational position between the first and third position.

In some embodiments, the providing of the power is mechanically controlled by the switch, and the method further includes moving the shutter in response to receiving a force from a user to move the switch.

In some embodiments, the storing is in response to checking that one or more conditions are met, the one or more conditions relating to a timestamp, an elapsed time since last acquired FFC map, an elapsed time since powering on, a temperature, image uniformity, and/or thermal stability, and the selecting is according to one or more ranking criteria including temperature, rate of change in temperature, timestamp, and/or image uniformity associated with the plurality of FFC maps.

In some embodiments, the capturing of the thermal image of the shutter is in response to receiving a force from a user to move the switch from the first position to the third position by way of the second position and before the capturing of the thermal image of the scene.

In some embodiments, the capturing of the thermal image of the shutter is in response to receiving a force to move the switch from the third position to the first position by way of the second position and after the capturing of the image of the scene.

In some embodiments, the method further includes measuring a temperature of the shutter while the switch is at the second position; and measuring a temperature of a FPA in the IR imaging module while the switch is at the second position, wherein the acquiring of the FFC map is further based on the temperature of the shutter and the temperature of the FPA.

In some embodiments, the method further includes measuring a temperature of the shutter to determine radiometric calibration terms while the switch is at the second position; and applying the radiometric calibration terms to the IR imaging module.

The scope of the invention is defined by the claims. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 2A-F illustrate exemplary three-stage switch assemblies in accordance with one or more embodiments of the disclosure.

FIGS. 3A-C illustrate an exemplary operation of a three-stage switch of an IR imaging device in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
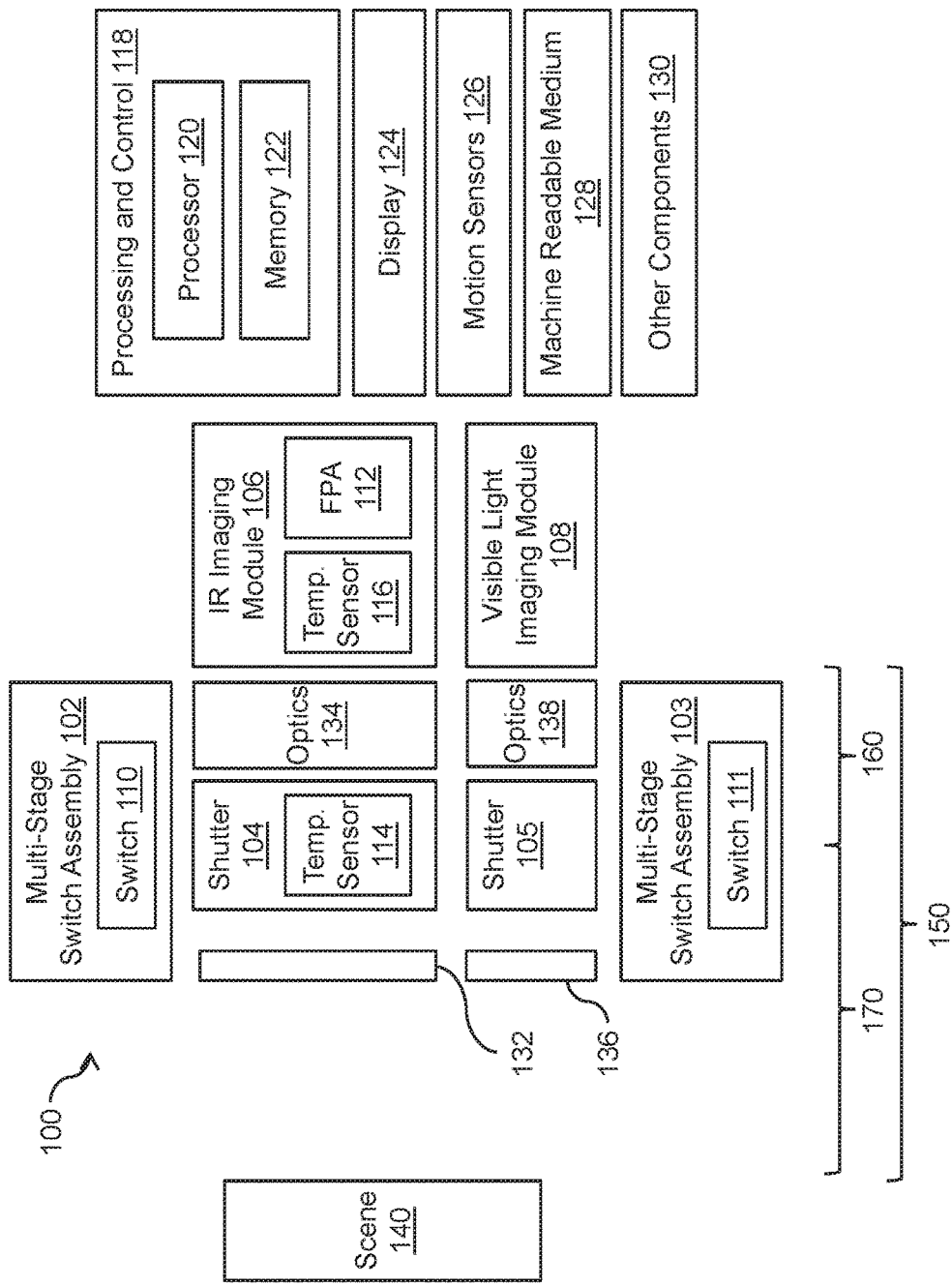
FIG. 1 illustrates an exemplary infrared (IR) imaging device including an integrated multi-stage switch and shutter in accordance with an embodiment of the disclosure.

FIG. 1 illustrates a block diagram of an infrared (IR) imaging device 100 in accordance with an embodiment of the invention. In one or more embodiments, IR imaging device 100 may include a multi-stage switch assembly 102, a shutter 104, an IR imaging module 106, and/or a visible light imaging module 108. Multi-stage switch assembly 102 may include a movable or rotatable switch 110. Shutter 104 may be coupled to switch 110. For example, shutter 104 may be mounted on switch 110 or otherwise mechanically coupled to switch 110 such that movement of shutter 104 depends on movement of switch 110. Alternatively, shutter 104 may be electronically coupled to switch 110 such that movement of shutter 104 is controlled by processing and control block 118, which may move shutter 104 in response to receiving movement of switch 110 as input. Shutter 104 may be coupled to or include a temperature sensor 114 configured to detect a temperature of shutter 104. IR imaging module 106 includes a focal plane array (FPA) 112 configured to detect IR radiation to provide IR image data (e.g., thermal image data). IR imaging module 106 may also be coupled to or include a temperature sensor 116 configured to detect a temperature of FPA 112.

In one or more embodiments, IR imaging device 100 may also include a processing and control block 118 including processor 120 and memory 122, a display 124, one or more motion sensors 126, a machine readable medium 128, and/or other components 130. IR imaging device 100 may further include a window 132 and/or one or more optics blocks 134 and for IR imaging module 106 and a window 136 and/or one or more optics blocks 138 for visible light imaging module 108.

In one or more embodiments, IR imaging device 100 may represent any type of IR camera or thermal imaging system not limited to any specific embodiment disclosed herein, and may be implemented as desired for particular applications. In this regard, the components illustrated in FIG. 1 may be implemented as a standalone IR camera in one embodiment, while in another embodiment the components of FIG. 1 may be distributed among a plurality of different devices. Thus, in one example, all or part of processing and control block 118 may be implemented in a host device such as a smart phone or other mobile device, with other components of FIG. 1 being implemented in a device attachment configured to be attached to the host device, for example, according to one or more aspects disclosed in U.S. patent application Ser. No. 13/901,428, filed May 23, 2013 and entitled "Device Attachment with Infrared imaging Sensor," and International Patent Application No. PCT/US2013/062433, filed Sep. 27, 2013 and entitled "Device Attachment with Infrared imaging Sensor," all of which are incorporated herein by reference in their entirety. In another example, all or part of processing and control block 118 may be implemented by one or more external computer systems that interface with IR imaging device 100 (e.g., over a network or other appropriate communication medium). In some embodiments, IR imaging device 100 may be implemented with greater, fewer, and/or different components than those illustrated in FIG. 1 as appropriate for particular applications.

In one or more embodiments, FPA 112 of IR imaging module 106 is configured to detect IR radiation from a scene 140 for a field of view (FOV) of FPA 112, and provide IR image data (e.g., via analog or digital signals) representing the IR radiation in response to detecting the IR radiation. FPA 112 may be implemented using any suitable type of IR detectors (e.g., quantum wells, microbolometers, thermopiles, or other types of detector elements responsive to IR radiation) that are arranged in a suitable pattern (e.g., a rectangular array, a square array, a one-dimensional array, or other arrangements) as may be desired for particular implementations. FPA 112 may include read-out integrated circuitry (ROIC) configured to generate analog or digital signals corresponding to the intensity of IR radiation received at each IR detector of FPA 112, and to interface with other components such as processing and control block 118. Further examples of ROICs and IR detectors (e.g., microbolometer circuits) may be found in U.S. Pat. No. 6,028,309, issued Feb. 22, 2000, which is incorporated herein by reference in its entirety.

In one or more embodiments, IR imaging module 106 may capture IR image data (e.g., a thermal image) using FPA 112. In the illustrated embodiment of FIG. 1, IR radiation from scene 140 passes along an optical path 150 through window 132 and one or more optics blocks 134 to reach IR imaging module 106 (e.g., a vacuum package assembly) when shutter 104 is open, as further described herein. Optics block 134 may be implemented, for example, with athermalized optics including one or more lenses (e.g., lens elements), and configured to focus the IR radiation onto FPA 112 provided in IR imaging module 106. One or more optics block 134 may be positioned behind the path of shutter 104, as shown in FIG. 1, in front of the path of shutter 104 (not shown in FIG. 1), or both. In one example, IR imaging module 106 and optics block 134 may be sealed inside a chamber including a window (e.g., a heated or temperature controlled protective window) (not shown in FIG. 1) positioned between optics block 134 and scene 140. In another example, one or more lenses of optics block 134 may be selectively inserted into optical path 150. Accordingly, IR imaging device 100 may be operated with various lenses (e.g., 25 mm, 35 mm, 50 mm, 140 mm, or others) as may be desired for particular applications. The different types of lenses may contribute to different non-uniformities in the propagation of IR radiation along optical path 150. Although window 132 and optics block 134 is shown in the embodiment of FIG. 1, window 132, optics block 134, or both may be omitted, or combined with shutter 104 or IR imaging module 106, according to various other embodiments.

In some embodiments, visible light imaging module 108 is configured to capture visible light image data (e.g., a visible light image of scene 140). IR imaging device 100 may include a shutter 105, a multi-stage switch assembly 103, and a switch 111 for visible light imaging module 108. Shutter 105 may be coupled to switch 111. For example, shutter 105 may be mounted on switch 111 or otherwise mechanically coupled to switch 111 such that movement of shutter 105 depends on movement of switch 111. Alternatively, shutter 105 may be electronically coupled to switch 111 such that movement of shutter 105 is controlled by processing and control block 118, which may move shutter 105 in response to receiving movement of switch 111 as input. In the illustrated embodiment of FIG. 1, visible light from scene 140 may pass along optical path 150 through window 136 and one or more optics blocks 138 to reach visible light imaging module 108. Window 136 (e.g., a protective window) may be positioned between optics block 138 and visible light imaging module 108. One or more optics blocks 138 may be positioned in front of the path of shutter 105, behind the path of shutter 105, or both. Although window 136 and optics block 138 is shown in the embodiment of FIG. 1, window 136, optics block 138, or both may be omitted, or combined with visible light imaging module 108, according to various other embodiments.

In one or more embodiments, switch assembly 102 has at least three stages—stage one, stage two, and stage three (S1, S2, and S3). Switch assembly 102 includes three positions that switch 110 may occupy, one for each stage. Accordingly, switch 110 has at least three positions on switch assembly 102. Switch 110 may have an S1 position in which IR imaging module 106 is powered off, an S2 position in which IR imaging module 106 is powered on and shutter 104 is positioned in the FOV of FPA 112 to be imaged by IR imaging module 106 for acquisition of flat field correction (FFC) terms (e.g., shutter 104 is closed), and an S3 position in which IR imaging module 106 is powered on and shutter 104 is positioned out of the FOV of FPA 112 (e.g., shutter 104 is open). Switch assembly 102, via the position of switch 110, may mechanically control power (e.g., by mechanically breaking or making an electrical contact to open or close an electrical circuit associated with providing power) provided to IR imaging module 106 and the position of shutter 104. Alternatively, switch assembly 102 may provide position of switch 110 to processing and control block 118, and processing and control block 118 may electrically control power provided to IR imaging module 106 and the position of shutter 104.

In one or more embodiments, the S2 position is intermediate in relation to the S1 position and the S3 position. In one example, the S1, S2, and S3 positions may be translational positions and switch 110 may be configured to move between the three translational positions along a continuous path on switch assembly 102. In another example, the S1, S2, and S3 positions may be rotational positions and switch 110 may be configured to rotate between the three rotational positions around an axis on switch assembly 102. Various embodiments of switch assembly 102 including switch 110 with three positions are further described below in relation to FIG. 2A-F. As may be appreciated, the terms S1, S2, and S3 are used merely as labels for purposes of identifying the various positions or stages associated with switch assembly 102, and are not, by themselves, meant to be limiting.

In one or more embodiments, when switch 110 is in the S3 position such that shutter 104 is open, FPA 112 detects IR radiation received from scene 140 along optical path 150 for a FOV. When switch 110 is in the S2 position such that shutter 104 is closed, shutter 104 substantially blocks IR radiation from passing from scene 140 to FPA 112 by being positioned in the FOV. In this case, FPA 112 instead detects IR radiation received from shutter 112 along an optical path 160, to the exclusion of IR radiation received along an optical path 170. In an example, shutter 104 may be implemented to approximate a thermal black body in front of IR imaging module 106 when IR imaging module 106 is calibrating FPA 112 to shutter 104 in its calibration mode, which may include determining FFC terms/values. The FFC terms/values may be applied to IR detectors of FPA 112 in order to correct for non-uniformities present in the IR detectors of FPA 112 and/or caused by optical path 160, as discussed further herein.

In one or more embodiments, switch assembly 103 has at least three stages—stage one, stage two, and stage three (S1, S2, and S3)—and includes three positions that switch 111 may occupy, one for each stage, as described herein in relation to switch assembly 102 and switch 110. The position of shutter 105 and the state of visible light imaging module 108 may depend on the position of switch 111 on switch assembly 103 similarly to the position of shutter 104 and the state of IR imaging module 106 depending on the position of switch 110 of switch assembly 102, as described herein. In some embodiments, switch assembly 103 and switch assembly 102 are one in the same and switch 110 and switch 111 are one in the same, such that switch 110/111 is coupled to both shutter 104 and 105. In other embodiments, switch assembly 103 and switch 111 are a separate switch assembly and a separate switch that are specific for visible light imaging module 108.

In one or more embodiments, processor 120 may include one or more processing systems configured with appropriate software (e.g., one or more computer programs for execution by processor 120) stored in memory 122 and/or on machine readable medium 128 to instruct processor 120 to perform one or more of the operations described herein. The one or more processing systems of processor 120 may include logic devices, microcontrollers, application specific integrated circuits (ASICs), programmable logic devices (PLDs), or other suitable processing systems. Memory 122 may include one or more memory devices to store data and information, including IR imaging data (e.g., thermal imaging data), IR images (e.g., thermal images), maps of FFC terms, radiometric calibration terms and/or other calibration terms. The one or more memory devices may include various types of memory including volatile and non-volatile memory devices, such as RAM (Random Access Memory), flash memory, EEPROM (Electrically-Erasable Read-Only Memory), ROM (Read Only Memory), a hard disk drive, or other suitable memory devices. Machine-readable medium 128 may include one or more mediums including a compact disc, such as a CD-ROM, a digital video disc, a flash drive, or other suitable medium. Processor 120 and memory 122 may be implemented in accordance with any desired combination of one or more processors and/or one or more memories as desired for particular implementations.

In one or more embodiments, memory 122 and/or machine readable medium 128 is configured to store a plurality of FFC terms, such as FFC maps (e.g., FFC terms associated with coordinates of a map, the coordinates representing locations on captured thermal images). The plurality of stored FFC maps may include factory FFC terms (e.g., factory FFC maps) acquired during manufacture, testing, and/or factory calibration (e.g., at the factory), and updated FFC terms (e.g., updated FFC maps) acquired in the field (i.e., outside the factory) during use by a user. The FFC terms (e.g., the FFC maps) may include high-frequency FFC terms (e.g., high-frequency components of the FFC terms) for correcting high-frequency non-uniformity and low-frequency FFC terms (e.g., low-frequency components of the FFC terms) for correcting low-frequency non-uniformity.

In some embodiments, the stored factory FFC maps include high-frequency FFC maps and low-frequency FFC maps, and the stored updated FFC maps only include high-frequency FFC maps. For example, low-frequency FFC terms for correcting non-uniformity may not change over time due to characteristics of IR imaging module design and may not be intended to be field-calibrated or upgraded, while high-frequency terms for correcting non-uniformity typically change over time and may become unusable after a certain duration of time has passed (e.g., more than a week, more than several weeks, more than a month, more than several months, etc.). Accordingly, factory low-frequency FFC maps may be continually used in the field, and factory high-frequency FFC maps may be replaced and/or upgraded by updated high-frequency FFC maps acquired in the field. In other embodiments, the stored factory FFC maps include high-frequency FFC maps and low-frequency FFC maps and the stored updated FFC maps also include high-frequency FFC maps and low-frequency FFC maps, so that both factory high-frequency FFC maps and factory low-frequency FFC maps are both upgraded and/or replaced by updated high-frequency FFC maps and updated low-frequency FFC maps.

In one or more embodiments, processing and control block 118 receives thermal image data captured by IR detectors of FPA 112 and processes the thermal image data to perform a flat field correction on the thermal image data to account for non-uniformities associated with the IR detectors of FPA 112 and other non-uniformities associated with other portions of optical path 150 (e.g., non-uniformities associated with optics block 134 or other portions of IR imaging device 100). Processing and control block 118 may thereby acquire FFC terms that may be used (e.g., applied to IR imaging module 106) to provide corrected thermal images that account for non-uniformities of FPA 112 and/or aberrations in optical path 150.

In one or more embodiments, processing and control block 118 may interface with shutter assembly 102 to determine the position of switch 110. Processing and control block 118 may receive thermal image data captured by FPA 112 either while switch 110 is at the S2 position, in which shutter 104 is inserted into optical path 150 (e.g., shutter 104 is closed), or while switch 110 is at the S3 position, in which shutter 104 is removed from optical path 150 (e.g., shutter 104 is open). As a result, processing and control block 118 may selectively calibrate FPA 112 along either optical path 150 (e.g., while shutter 104 is removed from optical path 150) or optical path 160 (e.g., while shutter 104 is inserted into optical path 150). For example, processing and control block 118 may determine flat field correction values (e.g., gain and offset values) associated with individual IR detectors of FPA 112 to correct for non-uniformities associated with the IR detectors for either optical path 150 or optical path 160. The FFC terms/values may be further processed to determine supplemental FFC terms/values to correct for non-uniformities associated with the IR detectors of FPA 112 for optical path 170. The determination of FFC terms/values, supplemental FFC terms/values, are further described in U.S. Pat. No. 8,373,757 entitled "Flat field correction for IR cameras," issued Feb. 12, 2013, which is incorporated herein by reference in its entirety.

In one or more embodiments, processor 120 operates IR imaging module 106 to capture a thermal image of shutter 104 while switch 110 is at or adjacent to the S2 position and acquire an FFC map of the FFC terms based on the thermal image of shutter 104. Processor 120 may operate IR imaging module to capture the thermal image of shutter 104 in response to switch 110 being moved from the S1 position to the S3 position by way of the S2 position to power on IR imaging module 106, or alternatively, in response to switch 110 being moved from the S3 position to the S1 position by way of the S2 position to power off IR imaging module 106.

In one or more embodiments, processor 120 stores the acquired FFC map as one of the plurality of FFC maps in memory 122, which may be in response to checking that one or more conditions are met, the one or more conditions relating to a timestamp, an elapsed time since last acquired FFC map, an elapsed time since powering on, a temperature, image uniformity, and/or thermal stability. Processor 120 may select one of the plurality of FFC maps stored in memory 122, which may be according to one or more ranking criteria including a temperature, a rate of change in temperature, a timestamp, and/or image uniformity associated with the plurality of FFC maps. Processor 120 may apply the selected FFC map to IR imaging module 106. Processor 120 may then operate IR imaging module 106 to capture a thermal image of a scene that is corrected using the selected FFC map while switch 110 is at the S3 position.

In some embodiments, processor 120 is configured to operate temperature sensor 114 to measure a temperature of shutter 104 while switch 110 is at the S2 position, operate IR imaging module 106 to measure a temperature of FPA 112 while switch 110 is at the S2 position, and acquire the FFC map further based on the temperature of shutter 104 and the temperature of FPA 112.

In some embodiments, processor 120 is configured to operate temperature sensor 114 to measure a temperature of shutter 104 to determine radiometric calibration terms while switch 110 is at the S2 position, and apply the radiometric calibration terms to the IR imaging module.

In some embodiments, a multi-stage switch assembly (e.g., switch assembly 102, switch assembly 103, or other switch assembly) may be used to activate other sensors in preparation for capturing an image (e.g., by IR imaging module 106, visible light imaging module 108, or other imaging module) when a switch (e.g., switch 110, switch 111, or other switch) is at an intermediate stage, such as the S2 position. For example, processor 120 may be configured to activate an ambient light sensor to measure ambient light to pre-adjust output, pre-adjust eye-piece screen automatic gain control (AGC), and/or pre-set image enhancement parameters in response to detecting the switch is at the S2 position.

In some embodiments, a multi-stage switch assembly (e.g., switch assembly 102, switch assembly 103, or other switch assembly) may be used to perform field bad pixel detection and replacement. Processor 120 may be configured to operate a module or device (IR imaging module 106, visible light imaging module 108, a projector, a television, a monitor, or other imaging product) to capture an image (e.g., an IR image of scene 140, a visible light image of scene 140, or a displayed image such as a screenshot) while a switch (e.g., switch 110, switch 111, or other switch) is at an intermediate stage, such as the S2 position. The captured image may be used to determine pixels that have gone bad, for example, during use in the field. During operation of the module or device while the switch is at the S3 position, the bad pixels in a captured or displayed image may be replaced using various image processing techniques (e.g., replacing bad pixels by interpolating from surrounding good pixels).

In one or more embodiments, display 124 may be used to display captured and/or processed IR images and/or other images, data, and information. Motion sensors 126 may be implemented by one or more accelerometers, gyroscopes, or other appropriate devices that may be used to detect movement of IR imaging device 100. Motion sensors 126 may be monitored by and provide information to processing and control block 118 to detect motion. In various embodiments, motion sensors 126 may be implemented as part of IR imaging device 100 (as shown in FIG. 1), IR imaging module 106, or other devices attached to or otherwise interfaced with IR imaging device 100.

Other components 130 of IR imaging device 100 may include various components as desired for particular implementations of IR imaging device 100. In some embodiments, other components 130 may include one or more indicator lights, such as LED indicators, that are configured to turn on or off to indicate various conditions or an operating status associated with IR imaging device 100. For example, one or more indicator lights may be used to indicate the power status (e.g., on, off, ready-state, or in other power modes) of IR imaging device 100, to indicate the position of shutter 104 and switch 110 (e.g., whether switch 110 is at the S2 position and shutter 104 is being imaged by IR imaging module 106 for acquisition of FFC terms), and/or to indicate the FFC terms acquisition state (e.g., whether the acquisition of FFC terms is complete or in progress). A user may, for example, observe one or more indicator lights to make sure FFC terms are acquired before moving switch 110 out of the S2 position. In some embodiments, one or more audible indicators (e.g., beepers or speakers) or vibrational indicators may be used in addition to or in place of the one or more indicator lights. In some embodiments, other components 130 may include a power block including a circuit board power subsystem (e.g., a power board) for IR imaging device 100. Such a power block may provide various power conversion operations and desired power supply voltages, power on-off switching, and/or various other operations, such as an interface to a battery or external power supply, as would be understood by one skilled in the art.

Advantageously, IR imaging device 100 including multi-stage switch assembly 102 with switch 110 coupled to shutter 104 may be configured to capture an image of shutter 104 (e.g., for non-volatile capture) for acquiring/updating FFC terms every power cycle (e.g., when powering on or powering off), which may be effective given a battery cycle (e.g., 6-8 hours). As the image for acquiring/updating FFC terms is captured when switch 110 is at an intermediate state, such as the S2 position, while a user powers on or powers off IR imaging device 100, the FFC acquisition/update process is unobtrusive to the user. IR imaging device 100 may have no motors or solenoids, which allow for miniaturization such that it is suitable for various devices, for example, hand-held thermal cameras and goggle thermal cameras. IR imaging device 100 may have no electronic motion control, which allows IR imaging device 100 to have high reliability, power savings, and noiseless operation. Switch 110 and/or shutter 104 may be configured to cover lenses (e.g., optics block 134) and/or sensors (e.g., IR imaging module 106) when switch 110 is at an off state, such as the S1 position, thereby functioning as a protective cover for the lenses and/or the sensors. Further, switch 110 and/or shutter 104 may have a bi-stable state that prevents glare and provides solar protection.

FIGS. 2A-F illustrate exemplary three-stage switch assemblies 202, 204, 206, and 208 in accordance with various embodiments of the disclosure. Each of switch assemblies 202, 204, 206, and 208 may be an implementation of switch assembly 102 in FIG. 1, and may be provided on an IR imaging device including an IR imaging module, such as IR imaging device 100 including IR imaging module 106 in FIG. 1. Each of switch assemblies 202, 204, 206, and 208 has at least three positions for a switch, such as switch 110 in FIG. 1. Each position for the switch may be a point location on the switch assembly or a range of locations, such as a line extending from one point to another point or an area extending between a plurality of points, on the switch assembly. A shutter, such as shutter 104 in FIG. 1, may be mounted on the switch or mechanically coupled to the switch such that movement of the shutter depends on movement of the switch. Accordingly, the shutter may be configured to move in and out of a FOV of a FPA, such as FPA 112 in FIG. 1, depending on the position of the switch.

FIGS. 2A-C show switch assembly 202 with a linear slide configuration. In various embodiments, switch assembly 202 may include at least three positions—position 212 (S1), position 214 (S2), and position 216 (S3)—that may be occupied by a movable switch 210. Position 214 is intermediate in relation to position 212 and position 216. Switch 210 is configured to move between position 212 and position 216 along a continuous linear path by way of position 214. As the path is linear, the direction of movement between position 212 and position 214 is the same as the direction of movement between position 214 and position 216. Position 214 may be located anywhere between position 212 and position 216, for example, at the center of the path of switch assembly 202, substantially at the center of the path of switch assembly 202, as shown in FIG. 2A, substantially closer to position 212 than position 216, as shown in FIG. 2B, or substantially closer to position 216 than position 212, as shown in FIG. 2C. In an example, the linear path may be horizontal relative to the IR imaging device such that a user may slides switch 210 left or right, as shown in FIGS. 2A-C. In another example, the linear path may be vertical relative to the IR imaging device such that a user may push or pull switch 210 up and down. In further examples, the linear path may have any other orientation relative to the IR imaging device.

In one or more embodiments, when switch 210 is at position 212, the IR imaging module is powered off, and the shutter may be positioned in the FOV of the FPA. When switch 210 is at position 214, the IR imaging module is powered on and the shutter is positioned in the FOV to be imaged by the IR imaging module for acquisition of FFC terms. When switch 210 is at position 216, the IR imaging module is powered on and the shutter is positioned out of the FOV such that the IR imaging module is able to capture an image of the scene. Switch 210 may be latched or otherwise held in place at position 212 and/or position 216. A user may move switch 210 to position 212 or position 216, and switch 210 will remain there until further moved by the user.

In some embodiments, a user may exert a force on switch 210 to move switch 210 from position 212 to position 216 by way of position 214 to turn on the IR imaging module, and the IR imaging module captures an image of the shutter for acquisition of FFC terms in response to switch 210 being moved from position 212 to position 216 by way of position 214 to turn on the IR imaging module. For example, while switch 210 moves from position 212 to 216, the IR imaging module may be powered on when switch 210 leaves position 212 and may capture the image of the shutter when switch 210 is at position 214 or adjacent to position 214 (e.g., closer to position 214 than to position 212 and/or position 216). Alternatively, while switch 210 moves from position 212 to 216, the IR imaging module may be powered on when switch 210 reaches or approaches position 214 and may capture the image of the shutter immediately or soon after being powered on. In one embodiment, position 214 may be closer to position 212 than to position 216, as shown in FIG. 2B. In such an embodiment, the IR imaging module captures the image of the shutter early on while switch 210 is being moved from position 212 to position 216, thereby advantageously providing the IR imaging device sufficient time to acquire FFC terms based on the image of the shutter and/or perform any other processes to prepare the IR imaging module to capture an image of a scene.

In some embodiments, a user may exert a force on switch 210 to move switch 210 from position 216 to position 212 by way of position 214 to turn off the IR imaging module, and the IR imaging module captures an image of the shutter for acquisition of FFC terms in response to switch 210 being moved from position 216 to position 212 by way of position 214 to turn off the IR imaging module. For example, while switch 210 moves from position 216 to 212, the IR imaging module captures the image of the shutter when switch 210 is at position 214 or adjacent to position 214 (e.g., closer to position 214 than to position 212 and/or position 216), and the IR imaging module is powered off when switch 210 reaches or approaches position 212. In one embodiment, position 214 may be closer to position 216 than to position 212, as shown in FIG. 2C. In such an embodiment, the IR imaging module captures an image of the shutter early on while switch 210 is being moved from position 216 to position 212, thereby advantageously providing the IR imaging device sufficient time to acquire FFC terms based on the image of the shutter and/or perform any other processes to shut down the IR imaging module.

FIG. 2D shows switch assembly 204 with an L-linear slide configuration. In various embodiments, switch assembly 204 may include at least three positions—position 222 (S1), position 224 (S2), and position 226 (S3)—for a movable switch 220. Position 224 is intermediate in relation to position 222 and position 226. Switch 220 is configured to move between position 222 and position 226 along a continuous path with a turn, a bend, or any other change in direction by way of position 224. Position 224 may be located anywhere between position 222 and position 226. For example, as shown FIG. 2D, position 224 may be located at the turn/bend point, which may form a corner, on the path. The path may have any orientation relative to the IR imaging device. The distance between position 222 and 224 may be different from, or the same as, the distance between position 224 and 226. The direction of movement between position 222 and position 224 and the direction of movement between position 224 and position 226 may be different such that the two directions form an angle. For example, the two directions may be substantially orthogonal such that the path is L-shaped, as shown in FIG. 2D. In another example, the angle between the two directions may be an acute angle such that the path is V-shaped, or an obtuse angle. In further examples, the path may have more than one turn, bend, or other change in direction.

In one or more embodiments, when switch 220 is at position 222, the IR imaging module is powered off, and the shutter may be positioned in the FOV of the FPA. When switch 220 is at position 224, the IR imaging module is powered on and the shutter is positioned in the FOV to be imaged by the IR imaging module for acquisition of FFC terms. When switch 220 is at position 226, the IR imaging module is powered on and the shutter is positioned out of the FOV such that the IR imaging module is able to capture an image of the scene. Switch 220 may be latched or otherwise held in place at position 222 and/or position 226. A user may move switch 220 to position 222 or position 226, and switch 220 will remain there until further moved by the user.

In some embodiments, a user may exert a force on switch 220 to move switch 220 from position 222 to position 226 by way of position 224 to turn on the IR imaging module, and the IR imaging module may capture an image of the shutter for acquisition of FFC terms in response to switch 220 being moved from position 222 to position 226 by way of position 224 to turn on the IR imaging module. For example, while switch 220 moves from position 222 to 226, the IR imaging module may be powered on when switch 220 leaves position 222 and may capture the image of the shutter when switch 220 is at position 224 or adjacent to position 224 (e.g., closer to position 224 than to position 222 and/or position 226). Alternatively, while switch 220 moves from position 222 to 226, the IR imaging module may be powered on when switch 220 reaches or approaches position 224 and may capture the image of the shutter immediately or soon after being powered on. A delay in the movement of switch 220 caused by the change in direction at position 224 may conveniently provide the IR imaging module with sufficient time to capture the image of the shutter while switch 220 is at or adjacent to position 224. In one embodiment, the distance between position 222 and position 224 may be smaller than the distance between position 224 and position 226, as shown in FIG. 2D. In such an embodiment, the IR imaging module captures the image of the shutter early on while switch 220 is being moved from position 222 to position 226, thereby advantageously providing the IR imaging device sufficient time to acquire FFC terms based on the image of the shutter and/or perform any other processes to prepare the IR imaging module to capture an image of a scene.

In some embodiments, a user may exert a force on switch 220 to move switch 220 from position 226 to position 222 by way of position 224 to turn off the IR imaging module, and the IR imaging module may capture an image of the shutter for acquisition of FFC terms in response to switch 220 being moved from position 226 to position 222 by way of position 224 to turn off the IR imaging module. For example while switch 220 moves from position 226 to 222, the IR imaging module captures the image of the shutter when switch 220 is at position 224 or adjacent to position 224 (e.g., closer to position 224 than to position 222 and/or position 226), and the IR imaging module is powered off when switch 220 reaches or approaches position 222. A delay in the movement of switch 220 caused by the change in direction at position 224 may conveniently provide the IR imaging module with sufficient time to capture the image of the shutter while switch 220 is at or adjacent to position 224. In one embodiment, the distance between position 222 and position 224 may be larger than the distance between position 224 and position 226 (not shown). In such an embodiment, the IR imaging module captures an image of the shutter early on while switch 220 is being moved from position 226 to position 222, thereby advantageously providing the IR imaging device sufficient time to acquire FFC terms based on the image of the shutter and/or perform any other processes to shut down the IR imaging module.

FIG. 2E shows switch assembly 206 with a circular slide configuration. In various embodiments, switch assembly 206 may include at least three positions—position 232 (S1), position 234 (S2), and position 236 (S3)—for a movable switch 230. Position 234 is intermediate in relation to position 232 and position 236. Switch 230 is configured to move between position 232 and position 236 along a continuous curved path by way of position 234. The curved path may have a circular shape, as shown in FIG. 2E, a semi-circular shape, a partially circular shape, an oval shape, a semi-oval shape, a partially oval shape, a wavy shape, or any other curved shape. Position 234 may be located anywhere between position 232 and position 236 on the path. The path may have any orientation relative to the IR imaging device and, for example, the location of position 232 may be at the bottom of a circular path, as shown in FIG. 2E, at the top of the circular path, on the right side of the circular path, on the left side of the circular path, or any other location. In an example, switch 230 may be configured to move from position 232 to position 236 by going around a circular path clockwise and passing position 234, but switch 230 may be blocked from moving from position 232 to position 236 by going around counter-clockwise, as shown in FIG. 2E. In another example, switch 230 may be configured to move from position 232 to position 236 by going around a circular path counter-clockwise and passing position 234, but switch 230 may be blocked from moving from position 232 to position 236 by going around clockwise.

In one or more embodiments, when switch 230 is at position 232, the IR imaging module is powered off, and the shutter may be positioned in the FOV of the FPA. When switch 230 is at position 234, the IR imaging module is powered on and the shutter is positioned in the FOV to be imaged by the IR imaging module for acquisition of FFC terms. When switch 230 is at position 236, the IR imaging module is powered on and the shutter is positioned out of the FOV such that the IR imaging module is able to capture an image of the scene. Switch 230 may be latched or otherwise held in place at position 232 and/or position 236. A user may move switch 230 to position 232 or position 236, and switch 230 will remain there until further moved by the user.

In some embodiments, a user may exert a force on switch 230 to move switch 230 from position 232 to position 236 around the curved path by way of position 234 to turn on the IR imaging module, and the IR imaging module may capture an image of the shutter for acquisition of FFC terms in response to switch 230 being moved from position 232 to position 236 by way of position 234 to turn on the IR imaging module. For example, while switch 230 moves from position 232 to 236, the IR imaging module may be powered on when switch 230 leaves position 232 and may capture the image of the shutter when switch 230 is at position 234 or adjacent to position 234 (e.g., closer to position 234 than to position 232 and/or position 236). Alternatively, while switch 230 moves from position 232 to 236, the IR imaging module may be powered on when switch 230 reaches or approaches position 234 and may capture the image of the shutter immediately or soon after being powered on. In one embodiment, the distance between position 232 and position 234 may be smaller than the distance between position 234 and position 236, as shown in FIG. 2E. In such an embodiment, the IR imaging module captures the image of the shutter early on while switch 230 is being moved from position 232 to position 236, thereby advantageously providing the IR imaging device sufficient time to acquire FFC terms based on the image of the shutter and/or perform any other processes to prepare the IR imaging module to capture an image of a scene.

In some embodiments, a user may exert a force on switch 230 to move switch 230 from position 236 to position 232 around the curved path by way of position 234 to turn off the IR imaging module, and the IR imaging module may capture an image of the shutter for acquisition of FFC terms in response to switch 230 being moved from position 236 to position 232 by way of position 234 to turn off the IR imaging module. For example while switch 230 moves from position 236 to 232, the IR imaging module captures the image of the shutter when switch 230 is at position 234 or adjacent to position 234 (e.g., closer to position 234 than to position 232 and/or position 236), and the IR imaging module is powered off when switch 230 reaches or approaches position 232. In one embodiment, the distance between position 232 and position 234 may be larger than the distance between position 234 and position 236 (not shown). In such an embodiment, the IR imaging module captures an image of the shutter early on while switch 230 is being moved from position 236 to position 232, thereby advantageously providing the IR imaging device sufficient time to acquire FFC terms based on the image of the shutter and/or perform any other processes to shut down the IR imaging module.

FIG. 2F shows switch assembly 208 with a circular rotation configuration. In various embodiments, switch assembly 208 may include at least three rotational positions—position 242 (S1), position 244 (S2), and position 246 (S3)—for a rotatable switch 240. Position 244 is intermediate in relation to position 242 and position 246. Switch 240 is configured to rotate around an axis, and position 244 has a rotational position between position 242 and position 246. Position 244 may have a rotational position with any angle relative to position 242 and position 246 around the axis. Switch 240 may have a circular shape, as shown in FIG. 2E, an oval shape, other round shape, a polygonal shape (e.g., a square or a triangle), or any other shape. Switch 244 may be marked to indicate its current rotational position, such as by a solid arrow as shown in FIG. 2E, and the rotational position for position 242, 244, and 246 may be indicated by a mark adjacent to the switch, as shown in FIG. 2E. In an example, switch 240 may be configured to rotate from position 242 to position 246 by rotating clockwise and passing position 244, but switch 240 may be blocked from rotating from position 242 to position 246 by turning counter-clockwise, as indicated by the curved arrow in FIG. 2E. In another example, switch 240 may be configured to rotate from position 242 to position 246 by turning counter-clockwise and passing position 244, but switch 240 may be blocked from rotating from position 242 to position 246 by turning clockwise.

In one or more embodiments, when switch 240 is at position 242, the IR imaging module is powered off, and the shutter may be positioned in the FOV of the FPA. When switch 240 is at position 244, the IR imaging module is powered on and the shutter is positioned in the FOV to be imaged by the IR imaging module for acquisition of FFC terms. When switch 240 is at position 246, the IR imaging module is powered on and the shutter is positioned out of the FOV such that the IR imaging module is able to capture an image of the scene. Switch 240 may be latched or otherwise held in place at position 242 and/or position 246. A user may rotate switch 240 to position 242 or position 246, and switch 2400 will remain in that rotational position until further rotated by the user.

In some embodiments, a user may exert a rotational force on switch 240 to rotate switch 240 from position 242 to position 246 by way of position 244 to turn on the IR imaging module, and the IR imaging module may capture an image of the shutter for acquisition of FFC terms in response to switch 240 being rotated from position 242 to position 246 around the axis by way of position 244 to turn on the IR imaging module. For example, while switch 240 rotates from position 242 to 246, the IR imaging module may be powered on when switch 240 leaves position 242 and may capture the image of the shutter when switch 240 is at position 244 or adjacent to position 244 (e.g., the arrow of switch 244 is closer to the marker for position 244 than to markers for position 242 and/or position 246). Alternatively, while switch 240 rotates from position 242 to 246, the IR imaging module may be powered on when switch 240 reaches or approaches position 244 and may capture the image of the shutter immediately or soon after being powered on. In one embodiment, the rotational angle between position 242 and position 244 may be smaller than the rotational angle between position 244 and position 246, as shown in FIG. 2E. In such an embodiment, the IR imaging module captures the image of the shutter early on while switch 240 is being rotated from position 242 to position 246, thereby advantageously providing the IR imaging device sufficient time to acquire FFC terms based on the image of the shutter and/or perform any other processes to prepare the IR imaging module to capture an image of a scene.

In some embodiments, a user may exert a rotational force on switch 240 to rotate switch 240 from position 246 to position 242 around the axis by way of position 244 to turn off the IR imaging module, and the IR imaging module may capture an image of the shutter for acquisition of FFC terms in response to switch 240 being rotated from position 246 to position 242 by way of position 244 to turn off the IR imaging module. For example while switch 240 rotates from position 246 to 242, the IR imaging module captures the image of the shutter when switch 240 is at position 244 or adjacent to position 244 (e.g., the arrow of switch 244 is closer to the marker for position 244 than to markers for position 242 and/or position 246), and the IR imaging module is powered off when switch 240 reaches or approaches position 242. In one embodiment, the rotational angle between position 242 and position 244 may be larger than the rotational angle between position 244 and position 246 (not shown). In such an embodiment, the IR imaging module captures an image of the shutter early on while switch 240 is being rotated from position 246 to position 242, thereby advantageously providing the IR imaging device sufficient time to acquire FFC terms based on the image of the shutter and/or perform any other processes to shut down the IR imaging module.

In one or more embodiments, position 212, 222, 232, and 242 may be the S3 position and position 216, 226, 236, and 246 may be the S1 position such that the role of position 212, 222, 232, and 242 is switched with the role of position 216, 226, 236, and 246 described above. In such embodiments, when switch 210, 220, 230, or 240 is at position 216, 226, 236, or 246, respectively, the IR imaging module is powered off, and the shutter may be positioned in the FOV of the FPA. When switch 210, 220, 230, or 240 is at position 214, 224, 234, or 244, respectively, the IR imaging module is powered on and the shutter is positioned in the FOV to be imaged by the IR imaging module for acquisition of FFC terms. When switch 210, 220, 230, or 240 is at position 212, 222, 232, or 242, respectively, the IR imaging module is powered on and the shutter is positioned out of the FOV such that the IR imaging module is able to capture an image of the scene.

Switch assemblies 202, 204, 206, and 208, and respective switches 210, 220, 230, and 240 may implement and/or include one or more mechanical aspects described in International Patent Application No. PCT/US2014/073098, entitled "Techniques for Device Attachment with Dual Band Imaging Sensor," filed Dec. 31, 2014, which is incorporated herein by reference in its entirety.

FIGS. 3A-C illustrate an exemplary operation of a three-stage switch assembly 302 of an IR imaging device in accordance with an embodiment of the disclosure. Switch assembly 302 of the IR imaging device may be an implementation of switch assembly 102 of IR imaging device 100 in FIG. 1. Although FIGS. 3A-C show switch assembly 302 with an L-linear configuration, such as switch assembly 204 of FIG. 2D, any other three-stage switch assembly may be implemented, such as switch assembly 202, 206, or 208 shown in FIGS. 2A, 2B, 2C, 2E, and 2F.

In one or more embodiments, switch assembly 302 may include at least three positions-position 312 (S1), position 314 (S2), and position 316 (S3)—for a movable switch 310, such as switch 110 in FIG. 1. Switch 310 may be configured to move between position 312 and position 316 along a continuous path with a turn, a bend, or any other change in direction by way of position 314, which may be located at the turn/bend point on the path, as described above in relation to FIG. 2.

As shown in FIG. 3A, when switch 310 is at position 312, an IR imaging module, such as IR imaging module 106 in FIG. 1, is powered off and a shutter, such as shutter 104 in FIG. 1, is in closed position 324 such that an FPA active area 322 (e.g., the FOV of the FPA) is covered by the shutter, as represented by diagonal stripes.

As shown in FIG. 3B, when switch 310 is at position 314, the IR imaging module is powered on and the shutter is in closed position 324 such that FPA active area 322 (e.g., the FOV of the FPA) is covered by the shutter, as represented by diagonal stripes. While switch 310 is at position 314, the IR imaging module may capture an image of the shutter for acquisition of FFC terms.

As shown in FIG. 3C, when switch 310 is at position 316, the IR imaging module is powered on and the shutter is in open position 326 such that FPA active area 326 (e.g., the FOV of the FPA) is not covered by the shutter.

In some embodiments, the IR imaging module captures the thermal image of the shutter while switch 310 moves from position 312 to position 316. Accordingly, the IR imaging module captures the thermal image of the shutter at the stage shown in FIG. 3B while the IR imaging device transitions from the stage shown in FIG. 3A, passing the stage shown in FIG. 3B, to the stage shown in FIG. 3C.

In other embodiments, the IR imaging module captures the thermal image of the shutter while switch 310 moves from position 316 to position 312. Accordingly, the IR imaging module captures the thermal image of the shutter at the stage shown in FIG. 3B while the IR imaging device transitions from the stage shown in FIG. 3C, passing the stage shown in FIG. 3B, to the stage shown in FIG. 3A.

Figure 4:
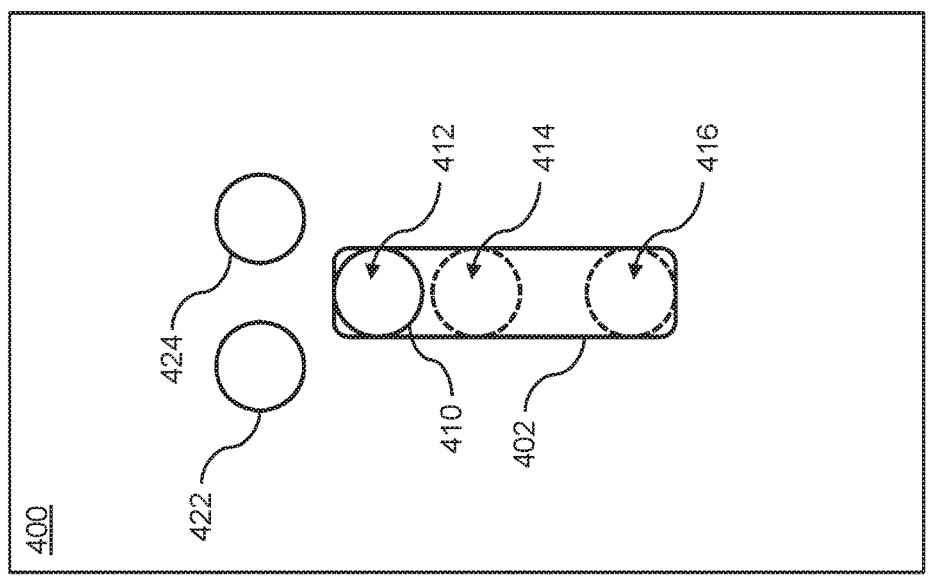
FIG. 4 illustrates a front side view of an exemplary IR imaging device including a three-stage switch in accordance with an embodiment of the disclosure.

FIG. 4 illustrates a front side view of an exemplary IR imaging device 400 in accordance with an embodiment of the disclosure. IR imaging device 400, such as IR imaging device 100 in FIG. 1, includes a three-stage switch assembly 402, such as switch assembly 102 in FIG. 1, an IR imaging module 422, such as IR imaging module 106, and an optional visible light imaging module 424, such as visible light imaging module 108 in FIG. 1. Switch assembly 402 may have a movable switch 410, such as switch 110 in FIG. 1, that can be slidingly moved from a position 412 (S1) to a position 416 by way of a position 414. Although FIG. 4 shows switch assembly 410 with a linear configuration, such as switch assembly 202 of FIG. 2A-C, any other three-stage switch assembly may be implemented, such as switch assembly 204, 206, or 208 shown in FIGS. 2D-F. Further, although switch assembly 402 is shown to be located on the same side of IR imaging device 400 as IR imaging module 422, switch assembly 402 may alternatively be located on another side of IR imaging device 400, such as on the opposite side with respect to the IR imaging module 422.

Figure 5:
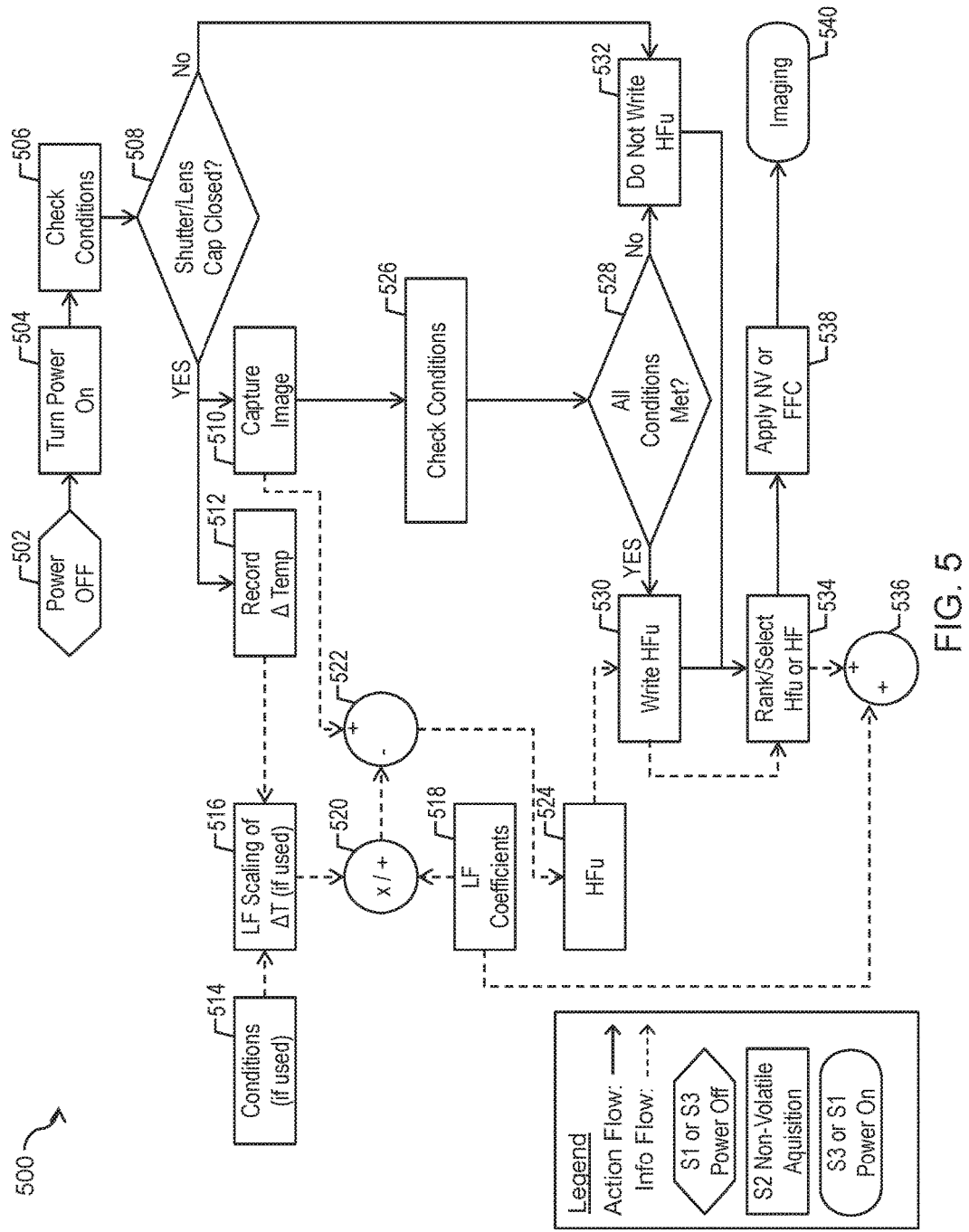
FIG. 5 illustrates a flow diagram of a process to calibrate an IR imaging device using a three-stage switch during power-up in accordance with an embodiment of the disclosure.

FIG. 5 illustrates a flow diagram of a process 500 to calibrate an IR imaging device, such as IR imaging device 100 in FIG. 1, using a three-stage switch assembly, such as switch assembly 102 in FIG. 1 or switch assembly 202, 204, 206, or 208 of FIGS. 2A-F, during power-up in accordance with an embodiment of the disclosure.

At block 502, a switch, such as switch 110 in FIG. 1 or switch 210, 220, 230, or 240 in FIGS. 2A-F, is in a S1 (or S3) position, such as position 212, 222, 232, or 242 in FIGS. 2A-F, such that the switch assembly is in S1 (or S3). An IR imaging module, such as IR imaging module 106 in FIG. 1, is powered off.

At block 504, the switch is moved to an S2 position, such as position 214, 224, 234, or 244 in FIGS. 2A-F, by a user such that the switch assembly is placed in S2. The IR imaging module is powered on and the shutter is placed in the FOV of the IR imaging module, blocking IR radiation from a scene.

At block 506, the IR imaging device (e.g., using a processor such as processor 120) may check conditions of the IR imaging device, including reading sensors of a shutter, such as shutter 104, and/or a lens cap of the IR imaging device.

At block 508, IR imaging device determines whether the shutter and/or lens cap is open or closed. The determination may be based on the reading of the shutter/lens cap sensors at block 504.

At block 510, the IR imaging device operates the IR imaging module to capture one or more thermal images of the shutter in response to determining that the shutter and/or lens cap is closed at block 508.

At block 512, the IR imaging device operates temperature sensors, such as temperature sensor 116 and temperature sensor 114, to measure a difference in temperature between a temperature of an FPA, such as FPA 112, and a temperature of the shutter, and records the temperature difference in response to determining that the shutter and/or lens cap is closed at block 508.

The one or more thermal images captured at block 510 and the temperature difference recorded at block 512 may be used to determine updated FFC terms/coefficients, such as one or more updated FFC maps. In one or more embodiments, the updated FFC terms include updated high-frequency FFC terms, such as an updated high-frequency FFC map, as described in blocks 514-524. In some embodiments, the updated FFC terms include updated high-frequency FFC terms, such as an updated high-frequency FFC map, and/or updated low-frequency FFC terms, such as an updated low-frequency FFC map.

In some embodiments, instead of measuring and storing the temperature difference the FPA and the shutter, the IR imaging device may determine and store the difference between heat or IR radiation flux levels of the FPA and the shutter for an improved accuracy. For example, in one embodiment, the difference between the IR radiation flux levels of the FPA and the shutter may be determined and stored, where the IR radiation flux level for temperature T may be expressed as:

$$\text{Flux}_{(T)} = \int_{\lambda_{low}}^{\lambda_{high}} \left( \frac{c1}{\lambda^5} \cdot \frac{1}{\exp\left(\frac{c2}{\lambda \cdot T}\right) - 1} \cdot RSR_{(\lambda)} \right) d\lambda$$

and where c1 and c2 are Planck's law coefficients, $\lambda_{high}$ and $\lambda_{low}$ are spectral limits for the FPA, and RSR is relative spectral response. Thus, based on the temperatures of the FPA and the shutter, the IR radiation flux levels for the FPA and the shutter may be determined, and the difference between the IR radiation flux levels may be stored. For embodiments in which the difference between IR radiation flux levels are used, IR imaging device 100 and process 500 may be modified to use the difference between IR radiation levels in place of the temperature difference where appropriate.

At block 514, the IR imaging device may check one or more conditions, if used, which may include thermal conditions, optical conditions, mechanical conditions, and/or other conditions. The IR imaging module may check thermal conditions such as temperatures, rate of change in temperature, and other temperature conditions, for example, using a temperature sensor such as temperature sensor 116 and/or 114. The IR imaging module may check optical conditions such as focal ratio (f/N, f-number, f-ratio, f-stop, or relative aperture), out-of-field flux, and/or other optical conditions. The IR imaging module may check mechanical conditions such as material properties, design construction, or other mechanical conditions.

At block 516, the IR imaging device may determine a scale factor and/or an offset, if used, for scaling and/or offsetting of a low-frequency FFC map based on the conditions checked at block 514. For example, scale factors and/or offset values for different thermal, optical, mechanical, and/or other conditions of the IR imaging device may be empirically determined and stored as one or more equations and/or in one or more look-up tables, so that an appropriate scale factor and/or an appropriate offset may be determined for adjusting a low-frequency FFC map according to the conditions checked at block 514. For other embodiments in which scaling and/or offsetting of a low-frequency FFC map are not used, block 516 may be omitted.

Scale factors may be determined, in one or more embodiments, using the various techniques described in U.S. Pat. No. 8,373,757, entitled "Flat field correction for infrared cameras," issued Feb. 12, 2013, which is incorporated herein by reference in its entirety. For some embodiments, a low-frequency FFC map may be determined based on a factory low-frequency FFC map (e.g., FFC terms or coefficients) and the current temperature difference ($\Delta T$) obtained at block 512, as further described below in connection with block 520. In such embodiments, a scale factor and/or an offset may be determined at block 516 for scaling and/or offsetting the current temperature difference $\Delta T$, which in turn would scale and/or offset the low-frequency FFC map.

At block 518, the IR imaging device may retrieve, read, or otherwise access from a memory, such as memory 122 or machine readable medium 128 in FIG. 1, a factory low-frequency FFC map that includes FFC terms/coefficients. As discussed above in connection with memory 122, low-frequency components of non-uniformity typically does not change much over time, and thus in some embodiments, a stable low-frequency FFC map and other associated data (e.g., a temperature or temperature difference), such as one acquired during manufacture, testing, and/or factory calibration, may be stored in memory 122 or machine readable medium 128 for retrieval (e.g., at block 518) and determination of current low-frequency components of non-uniformity (e.g., at block 520 below). In this regard, the term "factory" low-frequency FFC map, terms, or coefficients is not limited those acquired and stored at the factory, but includes any stable low-frequency FFC map, terms, or coefficients stored for retrieval and determination of current low-frequency components of non-uniformity.

At block 520, the IR imaging device may determine a low-frequency FFC map. In one or more embodiments, the low-frequency FFC map may be determined based on the factory low-frequency FFC map retrieved at block 518 and the current temperature difference ($\Delta T$) obtained at block 512. For example, in accordance with one or more embodiments, a low-frequency FFC map $LF_{(\Delta T)}$ for the temperature difference $\Delta T$ may be determined using a factory low-frequency FFC map (LFf) as follows:

$$\begin{aligned} LF_{(\Delta T)} &= \frac{LFf_{(\Delta T_f)} - LFf_{(\Delta T_i)}}{(\Delta T_f - \Delta T_i)} \cdot (\Delta T - \Delta T_f) + LFf_{(\Delta T_f)} \\ &= \frac{LFf_{(\Delta T_f)} - LFf_{(\Delta T_i)}}{(\Delta T_f - \Delta T_i)} \cdot (\Delta T - \Delta T_i) + LFf_{(\Delta T_i)} \\ &= \alpha \cdot \Delta T + \beta \end{aligned}$$

where $\Delta T_i$ and $\Delta T_f$ represent the temperature difference between the FPA and the shutter at the beginning of a factory calibration process and at the end of the factory calibration process, respectively, and where $LFf_{(\Delta Ti)}$ and $LFf_{(\Delta Tf)}$ represent the factory low-frequency FFC map acquired at the beginning of a factory calibration process and at the end of the factory calibration process, respectively.

Thus, in these embodiments, the low-frequency FFC map $LF_{(\Delta T)}$ for the current temperature difference $\Delta T$ between the FPA and the shutter as obtained at block 512 may be expressed in terms of, and determined based on, a linear equation having $\Delta T$ as a variable, with some arrangement of the factory low-frequency FFC maps $LFf_{(\Delta Ti)}$ and $LFf_{(\Delta Tf)}$ and the factory temperature differences $\Delta T_i$ and $\Delta T_f$ as coefficients. In this regard, for one or more embodiments, the factory low-frequency FFC maps $LFf_{(\Delta Ti)}$ and $LFf_{(\Delta Tf)}$ and the factory temperature differences $\Delta T_i$ and $\Delta T_f$ may be rearranged and stored as coefficients (e.g., as factory low-frequency FFC coefficients) for this linear equation. Also, according to one embodiment, the factory calibration process may be performed as soon as the IR imaging device is powered on, so that $\Delta T_i$ may be assumed to be zero to simplify the factory low-frequency coefficients to be stored for this linear equation.

In another aspect, for embodiments in which the low-frequency FFC map is scaled and/or offset, the scale factor and/or the offset determined at block 516 may be applied at block 520 to generate a scaled low-frequency FFC map by multiplying the scale factor and/or adding/subtracting the offset. In some embodiments, as discussed above in connection with block 516, the scaling and/or offsetting may be applied to the current temperature difference ΔT between the FPA and the shutter.

At block 522, the low-frequency FFC map determined at block 520 is subtracted from the captured image to generate, at block 524, an updated high-frequency FFC map including updated high-frequency FFC terms/coefficients. Thus, according to some embodiments, the low-frequency FFC map (e.g., for correcting low-frequency components of non-uniformity) is derived from the factory low-frequency FFC map, whereas the updated high-frequency FFC map (e.g., for correcting high-frequency components of non-uniformity) is obtained from the captured image of the shutter, more specifically the remainder of the captured image of the shutter after the low-frequency FFC map has been subtracted. In other embodiments, however, both the low-frequency and high-frequency components of FFC terms may be obtained from the captured image of the shutter and updated (e.g., together in one updated FFC map or in separate updated maps).

At block 526, the IR imaging device checks conditions to determine whether to store the updated high-frequency FFC map. The IR imaging device may check one or more conditions relating to a datestamp or a timestamp, an elapsed time since an updated FFC map was acquired, and/or an elapsed times since powering on. The IR imaging device may also check conditions relating to scene information, such as a temperature of the scene, and/or image uniformity. The IR imaging device may further check camera thermal conditions, such as a temperature of the IR imaging device, and/or thermal stability. IR imaging device may further check other conditions, for example, conditions relating to the quality/reliability of the one or more updated FFC maps.

At block 528, the IR imaging device determines whether all conditions or certain predetermined conditions checked at block 526 are met.

At block 530, the IR imaging device may write the updated high-frequency FFC map in a memory, such as memory 122 or machine readable medium 128 in FIG. 1, in response to determining the conditions are met at block 528.

At block 532, the IR imaging device may determine not to write the updated high-frequency FFC map in the memory in response to determining that the shutter and/or lens cap is not closed at block 508, or in response to determining the conditions are not met at block 528.

At block 534, the IR imaging device may rank and/or select one of a plurality of high-frequency FFC maps stored in the memory. The plurality of high-frequency FFC maps may include a factory high-frequency FFC map, previously stored updated high-frequency FFC maps, and/or the recently stored updated high-frequency FFC map at block 530. For example, the IR imaging device may select one of the plurality of high-frequency FFC maps according to one or more ranking criteria including a temperature, a rate of change in temperature, a timestamp, and/or image uniformity associated with the plurality of FFC maps.

At block 536, the IR imaging device may sum or otherwise combine the high-frequency FFC map selected at block 534 and the low-frequency FFC map (e.g., determined at block 520 based on the factory low-frequency FFC map retrieved at block 518 and the current temperature difference determined at block 512) to generate an updated combined FFC map.

At block 538, the IR imaging device may apply the high-frequency FFC map selected at block 534, such as by applying the updated combined FFC map generated at block 536 to the IR imaging module.

At block 540, the switch is moved to an S3 (or S1) position, such as position 216, 226, 236, or 246 in FIGS. 2A-F, by the user such that the switch assembly is placed in S3 (or S1). The IR imaging module is powered on and the shutter is positioned out of the FOV such that the IR imaging module is able to capture an image of the scene.

Acquisition of the updated FFC map during power-up advantageously provides convenient operation, as the updated FFC map may simply be acquired while the user powers on the IR imaging device by moving or rotating the switch. Such convenient operation may be implemented using mechanical designs that provide the IR imaging device enough time to perform the acquisition of the updated FFC map while the switch is moved from S1 to S3 (or S3 to S1) position, such as the mechanical design in FIGS. 2A-F.

Figure 6A:
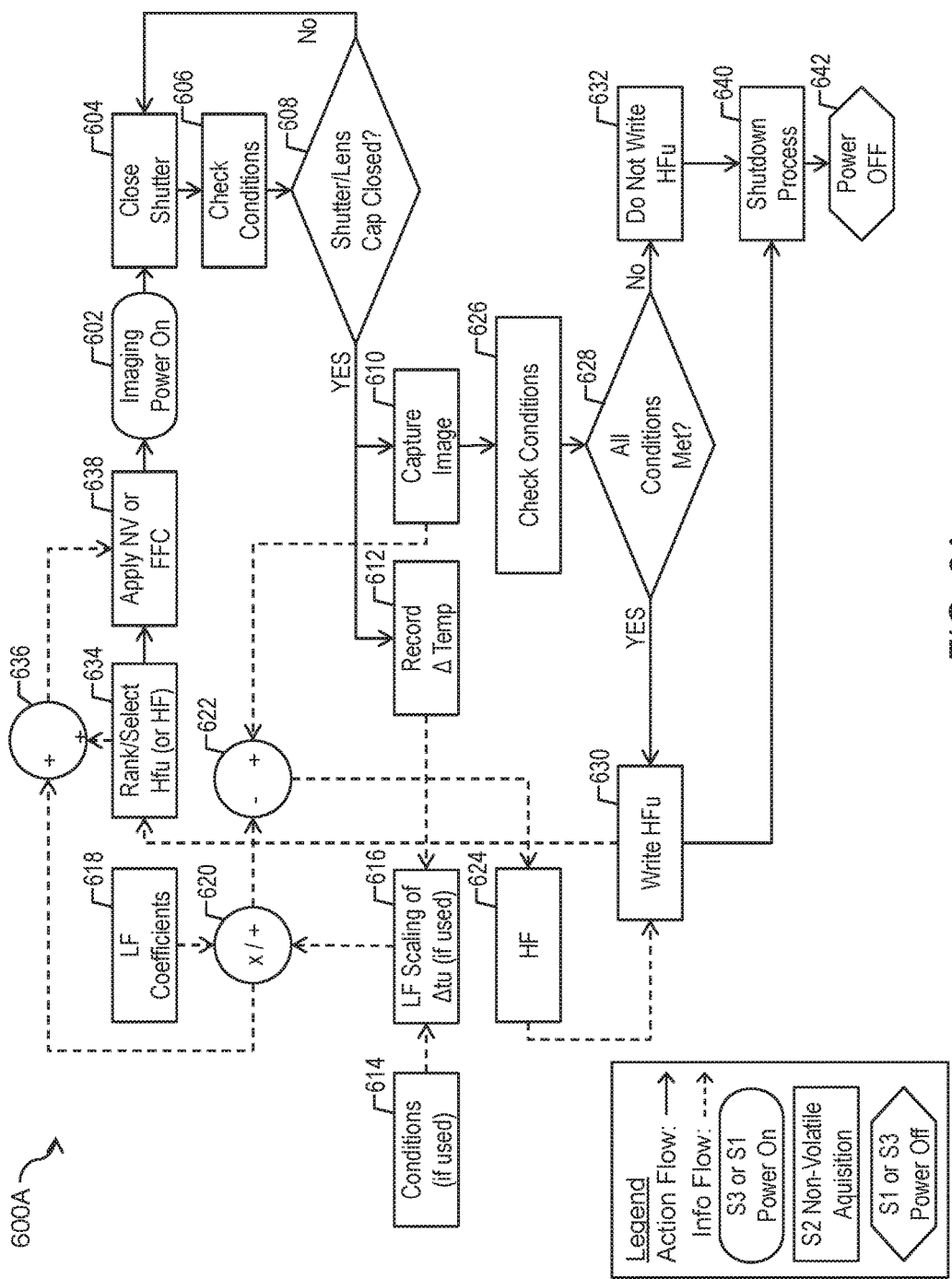
FIGS. 6A-B illustrate flow diagrams of processes to calibrate an IR imaging device using a three-stage switch during power-down in accordance with one or more embodiments of the disclosure.

FIG. 6A illustrates a flow diagram of a process 600A to calibrate an IR imaging device, such as IR imaging device 100 in FIG. 1, using a three-stage switch assembly, such as switch assembly 102 in FIG. 1 or switch assembly 202, 204, 206, or 208 of FIGS. 2A-F, during power-down in accordance with an embodiment of the disclosure.

At block 602, a switch, such as switch 110 in FIG. 1 or switch 210, 220, 230, or 240 in FIGS. 2A-F, is in a S3 (or S1) position, such as position 216, 226, 236, or 246 in FIGS. 2A-F, such that the switch assembly is in S3 (or S1). An IR imaging module, such as IR imaging module 106 in FIG. 1, is powered on and the shutter is positioned out of the FOV such that the IR imaging module is able to capture an image of a scene.

At block 604, the switch is moved to an S2 position, such as position 214, 224, 234, or 244 in FIGS. 2A-F, by a user such that the switch assembly is placed in S2. The IR imaging module is powered on and the shutter is placed in the FOV of the IR imaging module, blocking IR radiation from the scene.

At block 606, the IR imaging device (e.g., using a processor such as processor 120) may check conditions of the IR imaging device, including reading sensors of a shutter, such as shutter 104, and/or a lens cap of the IR imaging device.

At block 608, IR imaging device determines whether the shutter and/or lens cap is open or closed. The determination may be based on the reading of the shutter/lens cap sensors at block 606.

At block 610, the IR imaging device operates the IR imaging module to capture one or more thermal images of the shutter in response to determining that the shutter and/or lens cap is closed at block 608.

At block 612, the IR imaging device operates temperature sensors, such as temperature sensor 116 and temperature sensor 114, to measure a difference in temperature between a temperature of an FPA, such as FPA 112, and a temperature of the shutter, and records the temperature difference in response to determining that the shutter and/or lens cap is closed at block 608. In some embodiments, instead of measuring and storing the temperature difference the FPA and the shutter, the IR imaging device may determine and store the difference between heat or IR radiation flux levels of the FPA and the shutter as discussed above in connection with block 512 of process 500.

The one or more thermal images captured at block 610 and the temperature difference recorded at block 612 may be used to determine updated FFC terms/coefficients, such as one or more updated FFC maps. In one or more embodiments, the updated FFC terms include updated high-frequency FFC terms, such as an updated high-frequency FFC map, as described in blocks 614-624. In some embodiments, the updated FFC terms include updated high-frequency FFC terms, such as an updated high-frequency FFC map, and/or updated low-frequency FFC terms, such as an updated low-frequency FFC map.

At block 614, the IR imaging device may check one or more conditions, if used, which may include thermal conditions, optical conditions, mechanical conditions, and/or other conditions. The IR imaging module may check thermal conditions such as temperatures, rate of change in temperature, and other temperature conditions, for example, using a temperature sensor such as temperature sensor 116 and/or 114. The IR imaging module may check optical conditions such as focal ratio (f/N, f-number, f-ratio, f-stop, or relative aperture), out-of-field flux, and/or other optical conditions. The IR imaging module may check mechanical conditions such as material properties, design construction, or other mechanical conditions.

At block 616, the IR imaging device may determine a scale factor and/or an offset, if used, for scaling and/or offsetting of a low-frequency FFC map based on the conditions checked at block 614. For example, scale factors and/or offset values for different thermal, optical, mechanical, and/or other conditions of the IR imaging device may be empirically determined and stored as one or more equations and/or in one or more look-up tables, so that an appropriate scale factor and/or an appropriate offset may be determined for adjusting a low-frequency FFC map according to the conditions checked at block 614. For other embodiments in which scaling and/or offsetting of a low-frequency FFC map are not used, block 616 may be omitted. Scale factors may be determined, in one or more embodiments, using the various techniques described in the previously referenced U.S. Pat. No. 8,373,757. For some embodiments, a scale factor and/or an offset may be determined at block 616 for scaling and/or offsetting the current temperature difference $\Delta T$, as discussed above in connection with block 516 of process 500.

At block 618, the IR imaging device may retrieve, read, or otherwise access from a memory, such as memory 122 or machine readable medium 128 in FIG. 1, a factory low-frequency FFC map that includes FFC terms/coefficients.

At block 620, the IR imaging device may determine a low-frequency FFC map. In one or more embodiments, the low-frequency FFC map may be determined based on the factory low-frequency FFC map retrieved at block 618 and the current temperature difference ($\Delta T$) obtained at block 612, in a similar manner as described above for block 520 of process 500. In some embodiments, the scale factor and/or the offset determined at block 616 may be applied at block 620 to generate a scaled low-frequency FFC map by multiplying the scale factor and/or adding/subtracting the offset.

At block 622, the low-frequency FFC map determined at block 620 is subtracted from the captured image to generate, at block 624, an updated high-frequency FFC map including updated high-frequency FFC terms/coefficients. Thus, according to some embodiments, the low-frequency FFC map (e.g., for correcting low-frequency components of non-uniformity) is derived from the factory low-frequency FFC map, whereas the updated high-frequency FFC map (e.g., for correcting high-frequency components of non-uniformity) is obtained from the captured image of the shutter, as discussed above in connection with block 522 of process 500. In other embodiments, however, both the low-frequency and high-frequency components of FFC terms may be obtained from the captured image of the shutter and updated (e.g., together in one updated FFC map or in separate updated maps).

At block 626, the IR imaging device checks conditions to determine whether to store the updated high-frequency FFC map. The IR imaging device may check one or more conditions relating to a datestamp or a timestamp, an elapsed time since an updated FFC map was acquired, and/or an elapsed times since powering on. The IR imaging device may also check conditions relating to scene information, such as a temperature of the scene, and/or image uniformity. The IR imaging device may further check camera thermal conditions, such as a temperature of the IR imaging device, and/or thermal stability. IR imaging device may further check other conditions, for example, conditions relating to the quality/reliability of the one or more updated FFC maps.

At block 628, the IR imaging device determines whether all conditions or certain predetermined conditions checked at block 626 are met.

At block 630, the IR imaging device may write the updated high-frequency FFC map in a memory, such as memory 122 or machine readable medium 128 in FIG. 1, in response to determining the conditions are met at block 628.

At block 632, the IR imaging device may determine not to write the updated high-frequency FFC map in the memory in response to determining the conditions are not met at block 628.

At block 634, the IR imaging device may rank and/or select one of a plurality of high-frequency FFC maps stored in the memory. The plurality of high-frequency FFC maps may include a factory high-frequency FFC map, previously stored updated high-frequency FFC maps, and/or the recently stored updated high-frequency FFC map at block 628. For example, the IR imaging device may select one of the plurality of high-frequency FFC maps according to one or more ranking criteria including a temperature, a rate of change in temperature, a timestamp, and/or image uniformity associated with the plurality of FFC maps.

At block 636, the IR imaging device may sum or otherwise combine the high-frequency FFC map selected at block 634 and the low-frequency FFC map (e.g., determined at block 620 based on the factory low-frequency FFC map retrieved at block 618 and the current temperature difference determined at block 612) to generate an updated combined FFC map.

At block 638, the IR imaging device may apply the high-frequency FFC map selected at block 634, such as by applying the updated combined FFC map generated at block 636 to the IR imaging module.

At block 640, the IR imaging device performs a shutdown process for the IR imaging device.

At block 642, the switch is moved to an S1 (or S3) position, such as position 212, 222, 232, or 242 in FIGS. 2A-F, by the user such that the switch assembly is placed in S1 (or S3). The IR imaging module is powered off.

In some embodiments, blocks 634-638 may be performed before the shutdown process at block 640 and powering off of the IR imaging device at 642. In other embodiments, blocks 634-638 may be performed after the shutdown process at block 640 and powering off of the IR imaging device at block 642, such as during the next time the IR imaging device is being powered on, such as when the switch is at the S2 position while being moved from the S1 to S3 (or S3 to S1) position. Accordingly, acquisition of the updated FFC map during power-down advantageously provides easier time control, as acquisition of the updated FFC map may be performed while the switch is being moved from the S3 to S1 (or S1 to S3) position by the user to power off the IR imaging device, and the ranking and/or selection at blocks 634-648 may be performed while the switch is being moved from S1 to S3 (or S3 to S1) position by the user to power on the IR imaging device.

Figure 6B:
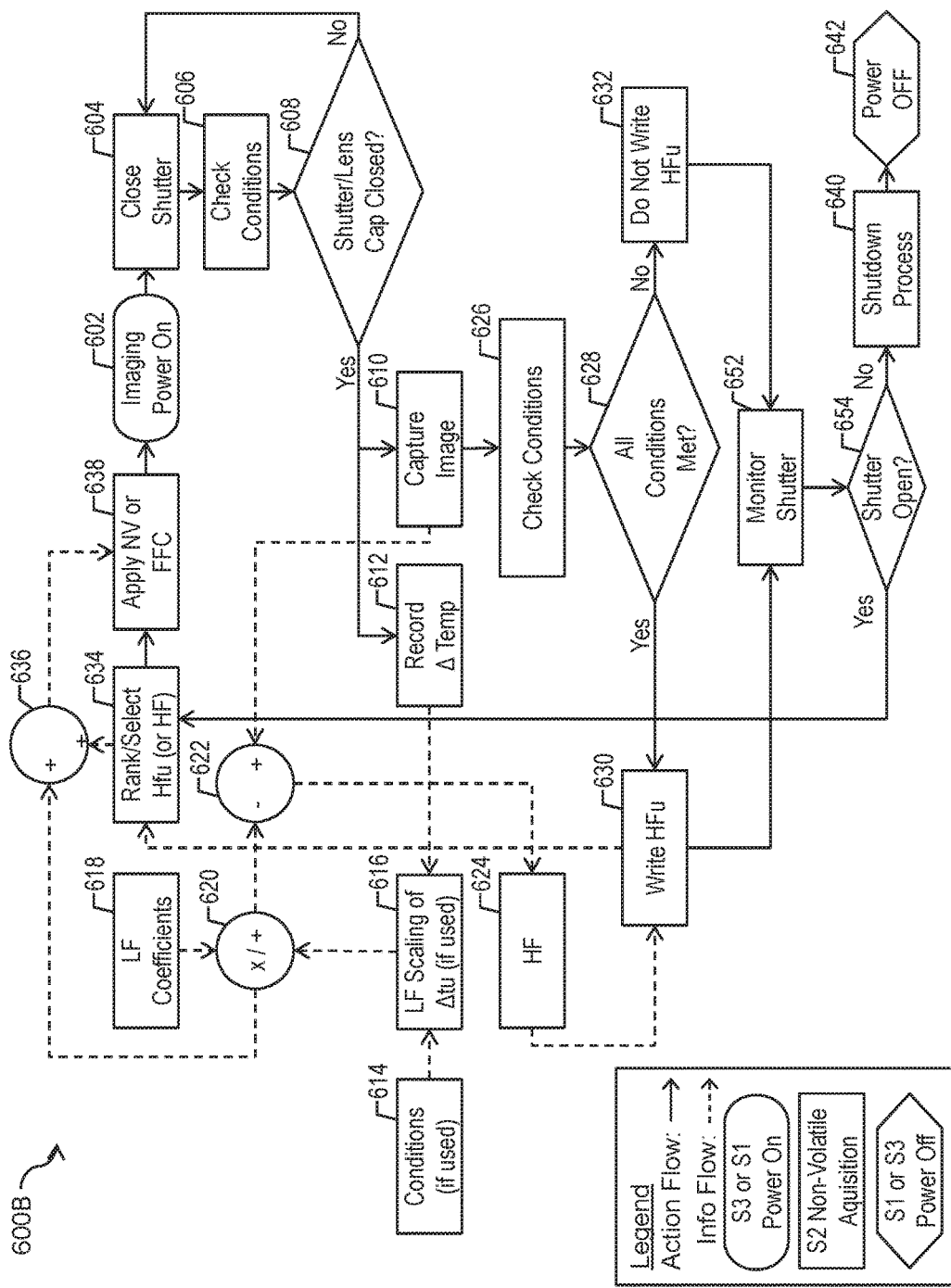

FIG. 6B illustrates a flow diagram of a process 600B to calibrate an IR imaging device, such as IR imaging device 100 in FIG. 1, using a three-stage switch assembly, such as switch assembly 102 in FIG. 1 or switch assembly 202, 204, 206, or 208 of FIGS. 2A-F, during power-down in accordance with another embodiment of the disclosure.

FIG. 6B blocks 602-642 are as described above in relation to FIG. 6A. In addition to capturing an image of the shutter to determine an updated FFC map during power-down, the IR imaging device may also capture an image of the shutter to determine an updated FFC map during operation of the IR imaging device without turning the IR imaging device off.

At block 652, the IR imaging device monitors if the shutter and/or lens cap is being opened or has been opened, such as by detecting whether the switch is being moved to, or has been moved to, the S3 (S1) position by the user. The IR imaging device may monitor if the shutter and/or lens cap is opened within an FFC time, such as within the time it takes to determine the updated FFC map as described in blocks 614-624.

At block 654, the IR imaging device determines whether the shutter and/or lens cap is being opened or has been opened. If it is determined that the shutter and/or lens cap is being opened or has been opened at block 654, the IR imaging device may rank and/or select one of a plurality of high-frequency FFC maps stored in the memory. If it is determined that the shutter and/or lens cap is not being opened or has been opened at block 655, the IR imaging device may perform the shutdown process at block 640 and power off the IR imaging module at block 642.

Where applicable, the various described embodiments may be implemented using hardware, software, or combinations of hardware and software. Also where applicable, the various hardware components and/or software components set forth herein may be combined into composite components comprising software, hardware, and/or both without departing from the spirit of the disclosure. Where applicable, the various hardware components and/or software components set forth herein may be separated into sub-components comprising software, hardware, or both without departing from the spirit of the disclosure. In addition, where applicable, it is contemplated that software components may be implemented as hardware components, and vice-versa. In some embodiments, such hardware components (e.g., processing and control block 118) may be implemented as one or more appropriate processors and/or processing devices (e.g., logic device, microcontroller, processor, application specific integrated circuit (ASIC), field programmable gate array (FPGA), or other device) that may be used to execute appropriate instructions, such as software instructions implementing any of the processes described herein.

Software in accordance with the various described embodiments, such as program code and/or data, may be stored on one or more machine readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

I claim:

1. A device, comprising:
an infrared (IR) imaging module configured to capture thermal images for a field of view (FOV); and
a switch assembly including a switch coupled to a shutter, the switch having at least:
a first position in which the IR imaging module is powered off,
a second position in which the IR imaging module is powered on and the shutter is positioned in the FOV to be imaged by the IR imaging module for acquisition of flat field correction (FFC) terms, and
a third position in which the IR imaging module is powered on and the shutter is positioned out of the FOV,
wherein the second position is intermediate in relation to the first position and the third position.

2. The device of claim 1, wherein the switch is configured to move between the first and third position along a contiguous path, and wherein the second position is intermediate by being located on the path between the first and third position.

3. The device of claim 2, wherein the switch is configured to move between the first and second position along a first direction and between the second and third position along a second direction, and wherein:
the path is linear and the first and second direction are one in the same;
the path is an L-shape and the first and second direction are substantially orthogonal; or
the path is an arch and the first and second direction are around the arch.

4. The device of claim 1, wherein the switch is configured to rotate around an axis, and wherein the second position is intermediate by having a rotational position between the first and third position.

5. The device of claim 1, wherein the switch is configured to mechanically control power provided to the IR imaging module, and wherein the shutter is mounted on the switch or mechanically coupled to the switch such that movement of the shutter depends on movement of the switch.

6. The device of claim 1, further comprising:
a non-volatile memory configured to store a plurality of FFC maps; and
a processor configured to:
operate the IR imaging module to capture a thermal image of the shutter while the switch is at or adjacent to the second position;
acquire an FFC map of the FFC terms based on the thermal image of the shutter;
store the acquired FFC map as one of the plurality of FFC maps in the non-volatile memory;
select one of the plurality of FFC maps;
apply the selected FFC map to the IR imaging module; and operate the IR imaging module to capture a thermal image of a scene while the switch is at the third position.

7. The device of claim 6, wherein the processor is configured to:
store the acquired FFC map in response to checking that one or more conditions are met, the one or more conditions relating to a timestamp, an elapsed time since a last acquired FFC map, an elapsed time since powering on, a temperature, image uniformity, and/or thermal stability; and
select the one of the plurality of FFC maps according to one or more ranking criteria including a temperature, a rate of change in temperature, a timestamp, and/or image uniformity associated with the plurality of FFC maps.

8. The device of claim 6, wherein the processor is configured to:
operate the IR imaging module to capture the thermal image of the shutter in response to the switch being moved from the first position to the third position by way of the second position to power on the IR imaging module; and
operate the IR imaging module to capture the thermal image of the shutter in response to the switch being moved from the third position to the first position by way of the second position to power off the IR imaging module.

9. The device of claim 6, further comprising a temperature sensor configured to measure temperatures of the shutter, wherein the IR imaging module is configured to measure temperatures of a focal plane array (FPA) in the IR imaging module, and wherein the processor is configured to:
operate the temperature sensor to measure a temperature of the shutter while the switch is at the second position;
operate the IR imaging module to measure a temperature of the FPA while the switch is at the second position; and
acquire the FFC map further based on the temperature of the shutter and the temperature of the FPA.

10. The device of claim 6, further comprising a temperature sensor mounted on the shutter configured to measure temperatures of the shutter, wherein the processor is configured to:
operate the temperature sensor to measure a temperature of the shutter to determine radiometric calibration terms while the switch is at the second position; and
apply the radiometric calibration terms to the IR imaging module.

11. The device of claim 1, wherein the IR imaging module is configured to image the shutter while the switch is being moved from the first position to the third position by way of the second position.

12. The device of claim 1, further comprising an indicator component configured to provide an indication of a status of the acquisition of the FFC terms.

13. A method comprising:
providing power to an infrared (IR) imaging module in response to a switch coupled to a shutter being moved from a first position to a second position;
capturing a thermal image of the shutter while the switch is at or adjacent to the second position, wherein the second position is intermediate in relation to the first position and a third position;
acquiring a flat field correction (FFC) map of FFC terms based on the thermal image of the shutter;
storing the acquired FFC map as one of a plurality of FFC maps;
selecting one of the plurality of FFC maps;
applying the selected FFC map to the IR imaging module; and
capturing a thermal image of a scene while the switch is at the third position.

14. The method of claim 13, further comprising receiving a force from a user to move the switch between the first and third position along a contiguous path, wherein the second position is intermediate by being located on the path between the first and third position.

15. The method of claim 13, further comprising:
receiving a rotational force from a user to rotate the switch around an axis, wherein the second position is intermediate by having a rotational position between the first and third position;
measuring a temperature of the shutter to determine radiometric calibration terms while the switch is at the second position; and
applying the radiometric calibration terms to the IR imaging module.

16. The method of claim 13, wherein the providing of the power is mechanically controlled by the switch, the method further comprising moving the shutter in response to receiving a force from a user to move the switch.

17. The method of claim 13, wherein:
the storing is in response to checking that one or more conditions are met, the one or more conditions relating to a timestamp, an elapsed time since a last acquired FFC map, an elapsed time since powering on, a temperature, image uniformity, and/or thermal stability, and
the selecting is according to one or more ranking criteria including temperature, rate of change in temperature, timestamp, and/or image uniformity associated with the plurality of FFC maps.

18. The method of claim 13, wherein the capturing of the thermal image of the shutter is in response to receiving a force from a user to move the switch from the first position to the third position by way of the second position and before the capturing of the thermal image of the scene.

19. The method of claim 13, wherein the capturing of the thermal image of the shutter is in response to receiving a force to move the switch from the third position to the first position by way of the second position and after the capturing of the thermal image of the scene.

20. The method of claim 13, further comprising:
measuring a temperature of the shutter while the switch is at the second position; and
measuring a temperature of a focal plane array (FPA) in the IR imaging module while the switch is at the second position,
wherein the acquiring of the FFC map is further based on the temperature of the shutter and the temperature of the FPA.

* * * * *